US009590807B2

(12) United States Patent
Shastry et al.

(10) Patent No.: US 9,590,807 B2
(45) Date of Patent: Mar. 7, 2017

(54) IDENTITY BASED PUBLIC KEY CRYPTOSYSTEM

(71) Applicant: TATA CONSULTANCY SERVICES LIMITED, Mumbai, Maharashtra (IN)

(72) Inventors: Ravishankara Shastry, Karnataka (IN); Barkur Suryanarayana Adiga, Karnataka (IN); Rajan Mindigal Alasingara Bhattachar, Karnataka (IN); Shivraj Vijayshankar Lokamathe, Karnataka (IN); Balamuralidhar Purushotaman, Karnataka (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 329 days.

(21) Appl. No.: 14/228,396

(22) Filed: Mar. 28, 2014

(65) Prior Publication Data

US 2014/0294177 A1 Oct. 2, 2014

(30) Foreign Application Priority Data

Mar. 28, 2013 (IN) .......................... 1234/MUM/2013

(51) Int. Cl.
*H04L 9/08* (2006.01)
*H04L 9/30* (2006.01)

(52) U.S. Cl.
CPC .......... *H04L 9/0825* (2013.01); *H04L 9/0866* (2013.01); *H04L 9/302* (2013.01); *H04L 9/3013* (2013.01)

(58) Field of Classification Search
None
See application file for complete search history.

(56) References Cited

U.S. PATENT DOCUMENTS 5,150,411 A   9/1992  Maurer
5,761,310 A * 6/1998  Naciri ..................... H04L 9/302
                                                    380/286

(Continued)

OTHER PUBLICATIONS

Chae Hoon Lim et al., "Modified Maurer-Yacobis Scheme and Its Applications", AUSCRYPT, 1992: 308-323.

(Continued)

*Primary Examiner* — Azizul Choudhury
(74) *Attorney, Agent, or Firm* — Barnes & Thornburg LLP

(57) ABSTRACT

A method for generating cryptographic parameters comprises generating a private_IGTABLE based on an Euler totient function of a composite number ($\phi(n)$), where the private_IGTABLE includes a plurality of random numbers (x). Further, a public_IGTABLE based on the private_IGTABLE, a composite number (n), and a group generator element (g) is generated, where the public_IGTABLE includes a corresponding modular exponentiation under modulo n for each of the plurality of random numbers with g as base. Further, a public key of a user is computed based on the public_IGTABLE, an identity number (ID) corresponding to the user, and n. Further, a secret key of the user is generated based on the ID, a master private key, the $\phi(n)$, and the private_IGTABLE. Thereafter, the cryptographic parameters are provided to the user for performing encryption and decryption, where the cryptographic parameters include at least one of the ID, the public key, and the secret key.

17 Claims, 2 Drawing Sheets

(56) References Cited

U.S. PATENT DOCUMENTS

2002/0186848 A1* 12/2002 Shaik ...................... H04L 9/302
  380/285
2009/0003597 A1 1/2009 Gantman et al.

OTHER PUBLICATIONS

U.M. Maurer et al., "Non-Interactive Public Key Cryptography," Advances in cryptology—Eurocrypt '91, LNCS, vol. 547, 1991, pp. 498-507.
Elgamal, "A Public Key Cryptosystem and a Signature Schemen Based ON Discrete Logarithm," IEEE Trans. Inform. Theory, IT-31, 1985, pp. 469-472.
E. Okamoto et al., "Identity-Based Information Security Management System for Personal Computer Networks," IEEE JSAC, vol. 7, No. 2, 1989, pp. 290-294.
R. L. Rivest et al., "A Method of Obtaining Digital Signatures and Public Key Cryptosystem," Comm. ACM, 21, 2, 1978, pp. 120-126.

* cited by examiner

IDENTITY BASED PUBLIC KEY CRYPTOSYSTEM

PRIORITY CLAIM

This patent application claims priority to Indian Patent Application No. 1234/MUM/2013, filed 28 Mar. 2013, the disclosure of which is incorporated herein by reference in its entirety.

TECHNICAL FIELD

The present subject matter relates, in general, to identity based public key cryptography and, in particular, to a system and a method for generating cryptographic parameters for securing information.

BACKGROUND

In today's world, a lot of information is exchanged between several communicating parties. In certain cases, the information may be of high importance to the communicating parties, for example, banking information of a user sent over Internet, personal information of the user shared between the user and a website for setting up an account, and the like. Consequently, security of the information being exchanged is highly desirable by the communicating parties for ensuring secure transmission of the information in such cases.

One of the techniques used for achieving secure transmission of the information over insecure communication networks is cryptography. Cryptography is used to ensure secure transmission of the information in a susceptible environment where the information may be prone to attacks by hackers. Cryptography involves encryption of the information which is to be transferred over the insecure communication network followed by decryption of the information at the receiving end.

Typically, cryptography can be categorized into public key cryptography and private key cryptography. The public key cryptography involves generation of public keys and secret keys corresponding to users. These keys are used for encryption and decryption of the information along with other public parameters. A central authority, often referred to as public key infrastructure (PKI), is responsible for generating and maintaining these keys based upon a user's request and also for generating the public parameters. However, generation of the public key, the secret key is a time consuming process and in certain cases the PKI may take time in the order of days for computation of the public key and the secret key of the user.

SUMMARY

This summary is provided to introduce concepts related to generating cryptographic parameters for identity based non-pairing public key cryptography. These concepts are further described below in the detailed description. This summary is not intended to identify essential features of the claimed subject matter nor is it intended for use in determining or limiting the scope of the claimed subject matter.

In one embodiment, methods and systems for generating cryptographic parameters are described. The method comprises generating a private_IGTABLE based on an Euler totient function of a composite number ($\phi(n)$), where the private_IGTABLE includes a plurality of random numbers (x). Further, a public_IGTABLE based on the private_IG-TABLE, the composite number, and a group generator element (g) is generated, where the public_IGTABLE includes a corresponding modular exponentiation under modulo n for each of the plurality of random numbers with g as base. Further, a public key of a user is computed based on the public_IGTABLE, the composite number, and an identity number (ID) corresponding to the user. Further, a secret key of the user is generated based on the ID, a master private key, the Euler totient function of the composite number ($\phi(n)$) and the private_IGTABLE. Thereafter, the cryptographic parameters are provided to the user for performing encryption and decryption, wherein the cryptographic parameters include at least one of the ID, the public key, and the secret key.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
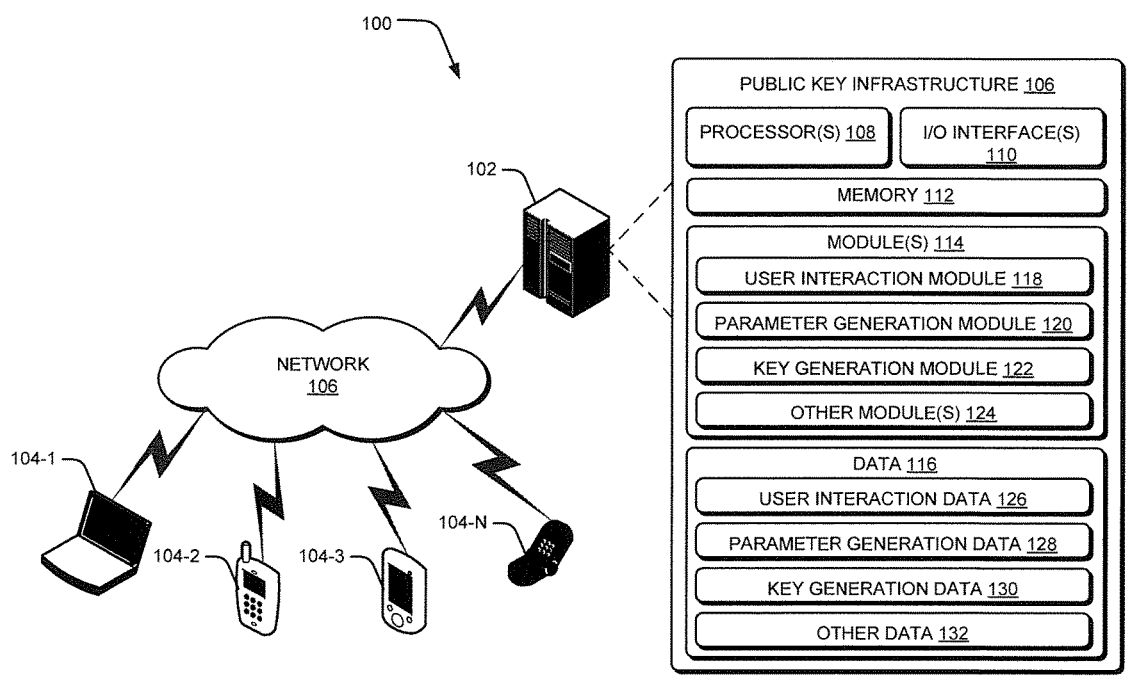
FIG. 1 illustrates a network environment implementing a public key infrastructure, according to an embodiment of the present subject matter.

In order to ensure secure transmission of information over a non-secure communication network, such as Internet, a sender may choose to encrypt the information before transmitting it to a receiver. The sender may employ any of the known public key cryptographic schemes, such as RSA, Diffie-Hellman scheme, Elliptic curve cryptography, ElGamal cryptography scheme, Digital signature algorithm (DSA), and the like, for encrypting the information which is to be sent over the non-secure communication network. For the purpose, the sender sends a request to a trusted central authority, such as a public key infrastructure (PKI) for providing cryptographic parameters required for encrypting the information. The cryptographic parameters include a set of public parameters and a secret key of the sender. Based on the request from the sender, the PKI generates the cryptographic parameters and provides the same to the sender for encrypting the information.

In certain pairing based public key cryptographic schemes, for example, pairing based elliptic curve cryptography, a public key generator (PKG) generates a public key and a secret key corresponding to a publically known identity of the user. The publically known identity may be any known information of the user, such as an e-mail address of the user, date of birth of the user, and phone number of the user. In such pairing based schemes, encryption and decryption algorithms involves mathematical pairing using bilinear mapping. However, such cryptographic schemes are computationally intensive and may not be suitable for implementing in small scale devices like handheld devices and smart phones.

In one conventional method for generating an identity number (ID) of the sender, non-pairing identity based public key cryptography techniques, such as Maurer-Yacobi scheme is used. In Maurer-Yacobi scheme, the PKI generates the ID of the user from the publically known information of the user. Further, the Maurer-Yacobi scheme involves generation of the secret key of the user based on well known condition of the Discrete Logarithm Problem (DLP) given below:

$$ID^2 \equiv g^x \pmod{n} \tag{1}$$

where, x is the secret key, g is a group generator element, ID is the identity number corresponding to the publically known information of the user and n is a composite number. The secret key of the user is computed as the discrete logarithm of the ID of the user modulo composite number n. Further, the ID in this scheme is generated using conventionally known squaring technique. However, the squaring technique is known to be vulnerable and can be easily attacked, thereby making the information easy to access in case of an attack. Moreover, the PKI needs great computing power to generate the secret keys of the users.

In another conventional method, the PKI generates the ID of the user using conventionally known Jacobi symbol method. Further, the PKI computes the secret key corresponding to the ID using conventional Pohlig-Hellman algorithm. However, computation of the secret key using the Pohlig-Hellman algorithm is computationally intensive and usually takes time in order of days. For instance, in a case where several users may wish to perform encryption, generation of their corresponding secret key may not be feasible in time. Further, the another conventional method is vulnerable to well known square root attack scheme.

In accordance with the present subject matter, a method and a system for generating cryptographic parameters for identity based public key cryptography are described. In one implementation, the PKI is configured to generate an ID and a secret key of a user in a manner such that the computational time for computing the ID and the secret key is significantly reduced. Additionally, the security of the cryptosystem, according to the present subject matter, is maintained.

According to an embodiment of the present subject matter, a first user and a second user, hereinafter collectively referred to as users, intending to exchange information over a non-secure communication network may seek to use public key cryptography for secure transmission of the information. For the purpose, the users may send a request to the PKI for the cryptographic parameters. Based on the request from the users, the PKI generates the cryptographic parameters.

In one implementation, the cryptographic parameters include a secret key and a set of public parameters. The public parameters may include a composite number (n), a group generator element (g), a master public key (e), a public IGTABLE, respective public keys of the users, and ID of the users. The PKI initially computes the composite number as a product of a first prime number and a second prime number. Each of the first prime number and the second prime number are of a form 3 mod 4 and have same bit length, where the minimum bit length is of at least 512 bits. Thereafter, the PKI selects the group generator element of a form such that the group generator element is primitive in both G1 and G2, where G1 and G2 are groups ascertained based on the first prime number and the second prime number, respectively. For example, the groups G1 and G2 may be Galois field groups ascertained based on the first prime number and the second prime number, respectively.

Subsequently, the PKI computes a master public key and a master private key based on an Euler totient function of the composite number. Further both the master public key and the master private key are relatively prime to each other and the Euler totient function of the composite number. In one case, the master public key is a k-bit odd integer, where the length of k in bits is at least equal to that of the first prime number and the second prime number. Further, it would be understood by a person skilled in the art that the value of "k" is one of the several parameters affecting the security of the cryptography scheme used for encryption.

In one implementation, the PKI is configured to generate a private_IGTABLE based on the Euler totient function. The private_IGTABLE is an array of length 256 bits and includes a plurality of random numbers. In one example, the random numbers included in the private_IGTABLE are in the range of one to a value equal to one less than the Euler totient function. Subsequently, the PKI generates a public_IGTABLE, an array of length 256 bits, based on the private_IGTABLE using one or more predetermined rules.

The PKI then computes the ID for each of the users based on the publically known information of the users. The publically known information can be, for example, an e-mail address, a phone number, a date of birth of the users. The PKI may compute the ID's using any hashing technique known in the art for obtaining the ID for each of the users. In one example, the ID of the user is a bit vector of 256 bit length. Further, the PKI generates the public key for each of the user based on their respective ID's, the public_IGTABLE, and the composite number.

Thereafter, the PKI computes the secret key for each of the users based on the private_IGTABLE, the master secret key, the Euler totient function of the composite number φ(n), and the ID of the corresponding user for which the secret key is being computed.

Subsequently, the PKI provides the cryptographic parameters to the users for securely exchanging the information. In one implementation, the PKI sends the secret key to each of the respective users. Further, the PKI publishes the public parameters which are subsequently used for encryption and decryption of the information to be communicated between parties.

In one implementation, upon receiving the cryptographic parameters from the PKI, the first user encrypts the information to obtain a ciphertext using the public key of the second user and its own signature. In said implementation, the first user may obtain the public key of the second user from the PKI. In another implementation, the first user computes the public key of the second user using the ID corresponding to the second user, the composite number, and the public_IGTABLE and subsequently encrypt the information. The signature may be understood as a proof of authenticity of the first user. Subsequently, the first user may send the ciphertext to the second user. The second user may decrypt the ciphertext to obtain the information using its own secret key and verify the signature for ensuring the authenticity of the sender.

In another embodiment, a sender requests the PKI for cryptographic parameters and subsequently encrypts the information using the cryptographic parameters to obtain the ciphertext. Subsequently, the sender may send the ciphertext to an intended receiver. The intended receiver, upon receiving the ciphertext may then contact the PKI for obtaining a secret key corresponding to an ID of the intended receiver. In said embodiment, the intended receiver decrypts the ciphertext to obtain the information using its secret key. As will be understood the PKI generates and stores the cryptographic parameters based on the requests from the sender and the intended receiver according to the process, as described previously.

As will be understood from the foregoing description, the private_IGTABLE and the public_IGTABLE generated in accordance with the principles of the present subject matter reduces the computational time and resources required for generating public key and the secret key of a user. Further, the present subject matter proposes a cryptosystem compatible with any of the known encryption and decryption techniques, thereby making the cryptosystem scalable. Thus, the system(s) and method(s) of the present subject matter provides an efficient cryptosystem for generating cryptographic parameters.

These and other advantages of the present subject matter would be described in greater detail in conjunction with the following figures. While aspects of described system(s) and method(s) for generating cryptographic parameters can be implemented in any number of different computing systems, environments, and/or configurations, the embodiments are described in the context of the following exemplary system(s).

FIG. 1 illustrates a network environment 100 implementing a public key infrastructure 102, in accordance with an embodiment of the present subject matter. In one implementation, the network environment 100 can be a public network environment including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The public key infrastructure 102 is communicatively connected to a plurality of user devices 104-1, 104-2, 104-3, . . . , and 104-N, collectively referred to as user devices 104 and individually referred to as a user device 104, through a network 106. The public key infrastructure 102 and the user devices 104 may be implemented in a variety of computing devices, including, servers, a desktop personal computer, a notebook or portable computer, a workstation, a mainframe computer, a laptop and/or communication device, such as mobile phones and smart phones. Further, in one implementation, the public key infrastructure 102 may be a distributed or a centralized network system in which different computing devices may host one or more of the hardware or software components of the public key infrastructure 102.

The public key infrastructure 102 may be connected to the user devices 104 over the network 106 through one or more communication links. The communication links may be enabled through a desired form of communication, for example, via dial-up modem connections, cable links, digital subscriber lines (DSL), wireless, or satellite links, or any other suitable form of communication.

The network 106 may be a wireless network, a wired network, or a combination thereof. The network 106 can also be an individual network or a collection of many such individual networks interconnected with each other and functioning as a single large network, e.g., the Internet or an intranet. The network 106 can be implemented as one of the different types of networks, such as intranet, local area network (LAN), wide area network (WAN), the interne, and such.

According to an embodiment of the present subject matter, the public key infrastructure 102 is configured to generate cryptographic parameters for identity based public key cryptography based on a request from a user. In one implementation, in order to ensure secure exchange of information, over a non-secure communication network, a first user and a second user, hereinafter collectively referred to as users, may use any of the well known public key cryptography techniques mentioned earlier. For the purpose, the users sends a request for cryptographic parameters to the public key infrastructure (PKI) 102 using corresponding user devices, say, user device 104-1 and user device 104-2, respectively. In one implementation, the cryptographic parameters include a secret key corresponding to an identity number (ID) of a user and a set of public parameters. The public parameters include a composite number 'n', a group generator element 'g', a master public key 'e', a public_IGTABLE, the ID's corresponding to the users, and the public key corresponding to the users to which the information is to be sent.

For the purpose, the public key infrastructure 102 may include one or more processor(s) 108, I/O interface(s) 110, and a memory 112 coupled to the processor 108. The processor(s) 108 can be a single processing unit or a number of units, all of which could include multiple computing units. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions and data stored in the memory 112.

The I/O interface(s) 110 may include a variety of software and hardware interfaces, for example, interfaces for peripheral device(s), such as a keyboard, a mouse, a display unit, an external memory, and a printer. Further, the I/O interface(s) 110 may enable the public key infrastructure 102 to communicate with other devices, such as, the user device 104, web servers and external databases.

The memory 112 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In one implementation, the public key infrastructure 102 also includes module(s) 114 and data 116.

The module(s) 114, amongst other things, include routines, programs, objects, components, data structures, etc., which perform particular tasks or implement data types. The module(s) 114 may also be implemented as, signal processor(s), state machine(s), logic circuitries, and/or any other device or component that manipulate signals based on operational instructions.

Further, the module(s) 114 can be implemented in hardware, instructions executed by a processing unit, or by a combination thereof. The processing unit can comprise a computer, a processor, such as the processor 108, a state machine, a logic array or any other suitable devices capable of processing instructions.

In another aspect of the present subject matter, the module(s) 114 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions can be also be downloaded to the storage medium via a network connection.

In one implementation, the module(s) 114 further include a user interaction module 118, a parameter generation module 120, a key generation module 122, and other module(s) 124. The other modules 124 may include programs or coded instructions that supplement applications and functions of the public key infrastructure 102.

The data 116 serves, amongst other things, as a repository for storing data processed, received, and generated by one or more of the module(s) 114. The data 116 includes user interaction data 126, parameter generation data 128, key generation data 130, and other data 132. The other data 132 includes data generated as a result of the execution of one or more modules in the module(s) 114.

In one implementation, the user interaction module 118 is configured to receive the request for cryptographic parameters from the users. The user interaction module 118 stores all such requests from different users connected to the PKI 102 in the user interaction data 126. Further, based on the request the parameter generation module 120 and the key generation module 122 may generate the cryptographic parameters.

In one implementation, the parameter generation module 120 is configured to generate the public parameters. The parameter generation module 120 initially selects a first prime number 'p1' and a second prime number 'p2'. The p1 and the p2 are of the form 3 modulo 4 and are selected such that the p1 and the p2 have equal bit length, where the bit length is of at least 512 bits. For example, the parameter generation module 120 may select the p1 and the p2 as given below:
p1:
13407807929942597099574024998205846127479-
365820592393377723561443721764030073546976801874298166903427690031858186486050853753882811946569946433649006084171
p2:
13407807929942597099574024998205846127479365820592393377723561443721764030073546976801874298166903427690031858186486050853-
753882811946569946433649006084823

Further, the parameter generation module 120 ascertains a group generator element of such a form that the group generator element is primitive in groups based on the p1 and the p2. In one implementation, the groups based on the p1 and p2 may be Galois field. In accordance with the previous example, the parameter generator module 120 may ascertain the group generator element as 3.

Subsequently, the parameter generation module 120 may generate the composite number 'n' using the p1 and the p2. In one implementation, the parameter generation module 120 is configured to compute the composite number 'n' as a product of the p1 and the p2 using the equation as expressed below:

$$n = p1 \times p2 \quad (2)$$

where n is the composite number and p1 and p2 are the first prime number and the second prime number of the aforementioned form, respectively. Based on the example above, the parameter generation module 120 generates the composite number as given below:
Composite Number n:
17976931348623159077293051907890247336179-
76978942306572734300811577326758055009631327084773224075360211201138798713933-
57658789768814416622492847430639484877
439727707387739343644350780689840332570841-
198051573940065116015537094581866149308213727957093712357916234851860052731956-
552494897453932396116127103636733

Subsequently, the parameter generation module 120 computes an Euler totient function (φ) of the composite number "n", denoted as (φ(n)), using the following equation:

$$\phi(n) = (p1-1)*(p2-1) \quad (3)$$

where φ(n) is the Euler totient function of the composite number n, p1 is the first prime number, and p2 is the second prime number. As will be understood, the PKI 102 stores the euler totient function of the composite number as a secret parameter, thereby maintaining the security level of the cryptosystem. As per the previous example, the parameter generation module 120 computes the Euler totient function of the composite number of the following form:
Euler Totient Function φ(n):
1797693134862315907729305190789024733617976978-
94230657273430081157732675805500963132708477322407536021120113879871393357658-
789768814416622492847430639484850624111847502545144496300784278148077612109556-
866787184617993128093566521719055354609979360759905502536171135487080630249044-
729273560792503248829091467740

Further, in one implementation, the parameter generation module 120 is configured to generate the master public key and a master private key, of the private key infrastructure 102, based on the Euler totient function of the composite number n, using a conventional technique, given by the following equation:

$$e \cdot d \equiv 1 \bmod \phi(n) \quad (4)$$

where, e is the master public key, d is the master private key, and φ(n) is the Euler totient function of the composite number n. Based on the above example, the parameter generation module 120 computes the master public key given below:
Master Public Key e:
484691785342434822160069135428477029653713967-
6992123301857778666956777381259335100166586629656466337896813535173468579661066-
603273609571404497799656642906314432597696001667202248231097103389259297686226-
34964755962709279110995371081157
21022177717341981130361958657545655222595764398-
6528023497517863595140190263
Master Private Key d:
1320834199673549398032082583133508944112171706-
73866518277025512421631184540209
877497141272615909707976218944891511216147953-
963512069959541789706806337033474132941951556319259831645815775203099414802298-
254231133262492039954045846427039
148265260105127770008178262019382673245594941-
343075296755209918178093187167

In one implementation, the master public key and the master secret key are relatively prime to each other and the Euler totient function of the composite number. In said implementation, the master public key is an odd integer of bit length k bits, where the value of k is chosen according to the security requirements of the cryptographic scheme and is of bit length at least equal to that of the p1 and the p2. The master private key, in one implementation, is a multiplicative inverse of the master public key modulo Euler totient function φ(n).

In one implementation, the parameter generation module 120 is configured to generate a private_IGTABLE based on the Euler totient function of the composite number n. The private_IGTABLE may be understood to be an array of length 256 and includes a plurality of random numbers. In one implementation, the parameter generation module 120 is configured to select the random number in the range of one and a value equal to one less than the Euler totient function of the composite number. Further, the parameter generation module 120 is configured to generate a public_IGTABLE which is an array of length 256, based on the group generator element, the composite number, and the plurality of random numbers included in the private_IGTABLE. In one implementation, the public_IGTABLE includes modular expo- The parameter generation module 120 generates the private_IGTABLE and the public_IGTABLE based on the IGTABLE generation process. In continuation to the example described above, a sample of the private_IGTABLE and the public_IGTABLE generated using the IGTABLE generation process is illustrated below:

| Samples of private IGTABLE and public IGTABLE | | |
|---|---|---|
| Serial No. | private_IGTABLE Value of 'x' | public_IGTABLE $g^x$(modn), where 'g' is goup generator element |
| 1 | 7147629171873333 3536426506737323 9667926153723333 388421979750 | 14876728894522264448492034420823354296281437269558731031114614616596337234655380811146974627506269687045378923111461461659633723465538081114697462750626968704537892024810689244207393539175876628492815916305725378879682144049552582702388427926246446391984921212651216217508894129855003572594695539900246326871252729133701379098492577437542147721458731344165291514769 |
| 2 | 8595788139911834 1639611168020291 4979179337488682 315348411977 | 10781239633982398254064441959748409958478856213244411969029455501647265312915156963948982029429801992846303720731121603149275740898442562461948298202162282612612293746301648753394016216641313983061231573410902097680256780447211236727807771922714325010950378901761348291315808725776405594411162365573794713 |
| 3 | 9429485165116483 3093568867144706 4105389164527852 738156242124 | 10639768398110137783362943146435573327288196371028447552520872166259523124816728959259168290946083208402332083010921820638416209962510322492388049622976632736265251891807473987956633677606493075159061707749711723663008866529334323777870086878573587270332841954493127143182768695436030618011275482575763476349 |
| 4 | 1416572502623942 7984842181923979 7232829883107824 756993976034 | 10369644223328239998438781965592431879172581057363985580090470517589561300334395095996090932696412713518949681503959309689062748641929619713016759630575583391379338604933513037366791171533243287655548527198797073300604095654629968517382425328335244308224338928342699931432979655746061148053305068281976583150388 | nentiation of each of the plurality of random numbers with group generator element g as the base. Further, the modular exponentiation is under modulo composite number n as illustrated by the relation given below:

$$g^x(\text{mod } n) \quad (5)$$

where, g is the group generator element, x is the random number included as an element in the private_IGTABLE and the value of x is in the range of 1 and $\phi(n)-1$, and n is the composite number.

In one implementation, the parameter generation module 120 generates the private_IGTABLE and the public_IGTABLE using an IGTABLE generation process. In said implementation, the IGTABLE generation process may be based on a pseudo-code as described below:

| IGTABLE GENERATION PROCESS |
|---|
| for i=1 to length do:<br>  x = randint(1,phiOfn)<br>  gPowx = pow(g,x) mod n  /* $g^x$(modn)*/<br>  private_IGTABLE[i] = x<br>  public_IGTABLE[i] = gPowx<br>end |

As illustrated above, the private_IGTABLE may be understood to include the plurality of random numbers in a column, where each of the random number is generated using the random integer generator function. Further, the public_IGTABLE may include modular exponentiation with group generator element g as the base and corresponding random number of the private_IGTABLE as the exponent under composite number n as modulus.

The parameter generation module 120, further, computes the ID corresponding to the users based on publically known information of the users. The publically known information, in one example, may be an e-mail address, a phone number, date of birth. In one implementation, the ID may be understood as a binary vector of length at least 256 bits. In another implementation, the ID may be a random bit vector of length at least 256 bits. The parameter generation module 120 computes the ID of the user using standard methods such as hashing technique or using a random bit vector generation process. The random bit vector generation process may be based on a pseudo-code as described below:

| RANDOM BIT VECTOR GENERATION PROCESS (FOR ID GENERATION) |
|---|
| length = 256<br>for i=1 to length do:<br>  idBin[i] = randint(0,1)<br>end |

As illustrated above, the ID is generated using the "randint" random function.

For example, the parameter generation module 120 computes an ID, say, IDA of a first user as a random bit vector using the random bit vector generation process mentioned above and obtains the IDA in the following form:

$IDA = [0, 0, 0, 1, 1, 0, 1, 0, 1, 1, 1, 1, 0, 0, 0, 0, 1, 0, 0, 1, 1, 0, 1, 0,$ $0, 0, 1, 0, 1, 0, 0, 0, 0, 0, 1, 1, 1, 0, 0, 1, 1, 0, 1, 1, 0, 1, 0, 1, 1, 1,$

-continued 0, 1, 0, 1, 1, 0, 1, 1, 1, 0, 1, 1, 1, 1, 1, 0, 1, 1, 1, 1, 1, 0, 1, 1, 1, 1, 0, 0, 0, 0, 0, 1, 0, 1, 1, 1, 0, 1, 1, 0, 1, 1, 0, 0, 1, 1, 0, 1, 0, 0, 0, 1, 0, 1, 1, 0, 0, 0, 0, 0, 1, 0, 1, 1, 0, 0, 0, 0, 1, 0, 1, 1, 1, 0, 0, 1, 1, 1, 0, 0, 1, 1, 0, 0, 1, 0, 1, 0, 1, 1, 0, 1, 1, 1, 1, 1, 0, 0, 1, 1, 1, 0, 0, 0, 0, 1, 1, 1, 0, 0, 1, 1, 1, 0, 1, 0, 0, 1, 1, 1, 0, 1, 1, 1, 0, 0, 1, 0, 1, 0, 1, 1, 0, 1, 1, 0, 0, 0, 1, 0, 0, 1, 0, 1, 1, 0, 1, 1, 0, 0, 0, 0, 1, 0, 1, 0, 0, 1, 0, 0, 1, 1, 1, 1, 0, 0, 1, 0, 0, 1, 0, 1, 0, 1, 0, 0, 1, 0, 1, 0, 1, 0, 1, 0, 1, 0, 1, 1, 0, 0, 0, 1, 0, 1, 0, 1, 1, 0, 0, 0, 0, 0, 1, 0, 1]

where, IDA is the random bit vector corresponding to the user.

The parameter generation module 120 stores the public parameters, the master private key, and the private_IG-TABLE in the parameter generation data 128. Subsequently, the key generation module 122 generates the public key of the users based on the ID's of the users, the public_IG-TABLE, and the composite number n. The public key is used in the encryption process. In one implementation, the key generation module 122 is configured to generate the public key of the users based on a user public key generation process. The user public key generation process may be based on a pseudo-code as described below:

USER PUBLIC KEY GENERATION PROCESS

```
PK = 1
for i=1 to length do:        /* length will be atleast 256 */
    if(idBin[i] == 1) do:
        PK = ( PK * public_IGTABLE[i]) mod n
    end
end
return PK
```

Here, idBin is the ID which is a binary vector. Based on the above example, the key generation module 122 computes the public key of the user given below:

Public Key of the User:
14081253985234677560253219429496906771988319783975505438706765246862476296147162055731610269284513897231999674129104359954917989279704487530428722915500301440176748776141801822048164347994107808754689188302821215647792485308106663588928678569488993287679357537394537194350886768257240696954731728342655492817 4

As illustrated above, the public key of the user is a large number generated using public_IGTABLE and corresponding ID of the user. Here, the user may be any of the first user or the second user.

Further, the key generation module 122 is configured to generate the secret key for each of the users based on their respective ID's, the master secret key, the private_IG-TABLE, and the Euler totient function φ(n). In one implementation, the key generation module 122 generates the secret key based on a user secret key generation process, where the user secret key generation process may be based on a pseudo-code as described below:

USER SECRET KEY GENERATION PROCESS

```
Xval = 0
for i=1 to length do:
    if(idBin[i] == 1) do:
        Xval = Xval + private_IGTABLE[i]
    end
end
SK = Xval * d (mod φ(n))
```

Here, idBin is the ID, in the form of a binary vector, of the user and SK is the secret key of the user. The key generation module 122 generates the secret key, based on the above example, provided below:

Secret Key 'SK' of the User:
10305579088833800667137359961424344404834450590307955504934308539761941954014416082935294561015484980691647461075971172474524072577819717670668890231371728791212654082021212600329450653337237039614522268499993846460028564856047984011714871926688258088119985113187885114710147634534734308069059056866034872293 2

As illustrated above, the secret key is a large number generated based on the master secret key, the private_IG-TABLE, the Euler totient function of the composite number φ(n), and the corresponding ID's of the users.

In one implementation, the key generation module 122 stores the public key and the secret key of the users in the key generation data 130. As will be understood, the key generation module 122 may generate separate secret keys for the first user and the second user. Further, the user interaction module 118 is configured to provide the public parameters and secret key, collectively called cryptographic parameters, to the users. The user interaction module 118 transmits the secret key corresponding to the first user and the second user, respectively to the user device 104-1 and the user device 104-2. Further, the user interaction module 118 is configured to publish the public parameters.

In one implementation, the first user encrypts the information which is to be sent to the second user based on the public parameters. Upon receiving the public parameters, included in the cryptographic parameters, the first user computes the public key of the second user using the ID of the second user, the public_IGTABLE, and the composite number 'n'. In another implementation, the first user may use the public key of the second user as published by the PKI 102. Subsequently, the first user encrypts the information using the public key of the second user and its own signature to obtain a ciphertext. The signature may be understood as an authenticity verification element in the ciphertext. The first user may then transmit the ciphertext to the second user over the non-secure communication network. On the other hand, the second user may decrypt the ciphertext using its own secret key and verifies the signature of the first user and obtain the information securely.

For the purpose of validation of the efficiency of the above described subject matter, an analysis of the time complexity of the proposed cryptosystem, in accordance with the principles of the present subject matter was performed. Time complexity may be understood as the amount of time taken by the algorithm to run and is based on the length of the input as will be understood by a person skilled in the art. A comparison of the time complexity for the proposed cryptosystem, in accordance with the present subject matter and two conventional cryptosystem, based on conventional Maurer-Yacobi scheme and Pohhlong scheme, respectively as described earlier is stated below. The comparison is done between the time complexities of the proposed cryptosystem and each of the two conventional cryptosystem listed below in table 1:

TABLE 1

| Serial no. | Cryptosystem | Time complexity |
|---|---|---|
| 1 | Conventional Cryptosystem 1 (based on Maurer-Yacobi Scheme) | $O(2^{(t/2)})$ |
| 2 | Conventional Cryptosystem 2 (based on Pohlig-Hellman algorithm) | $O(\sqrt{(n)}) + O(n^{(1/4)} \cdot polylog(n))$ |
| 3 | Proposed cryptosystem | $O(K)$ | where t is the bit length of the largest prime factor of the composite number 'n' used in the conventional cryptosystem 1, n is the composite number, based on prime numbers p1 and p2, used in the conventional cryptosystem 2, and K is the length of the ID, corresponding to the user, used in the proposed cryptosystem.

As observed, the time complexities for each of the conventional cryptosystem 1 and conventional cryptosystem 2 are based on the prime numbers selected for computation, whereas the time complexities of the proposed cryptosystem is independent of prime numbers, thereby reducing the computational time for generating the cryptographic parameters. Based on the proposed cryptosystem the computational time taken for the secret key generation, as explained above, is 5.50746917725e-08 seconds. Further, the time taken for the public key generation, as explained above, is 2.64716148376e-06 seconds.

The present subject matter thus facilitates faster generation of the cryptographic parameters, thereby reducing the computational time needed for generating the cryptographic parameters. Further, the present subject matter provides an efficient system, for example, the PKI 102 for generating the cryptographic parameters, thereby enabling an efficient identity based public key cryptography scheme.

Figure 2:
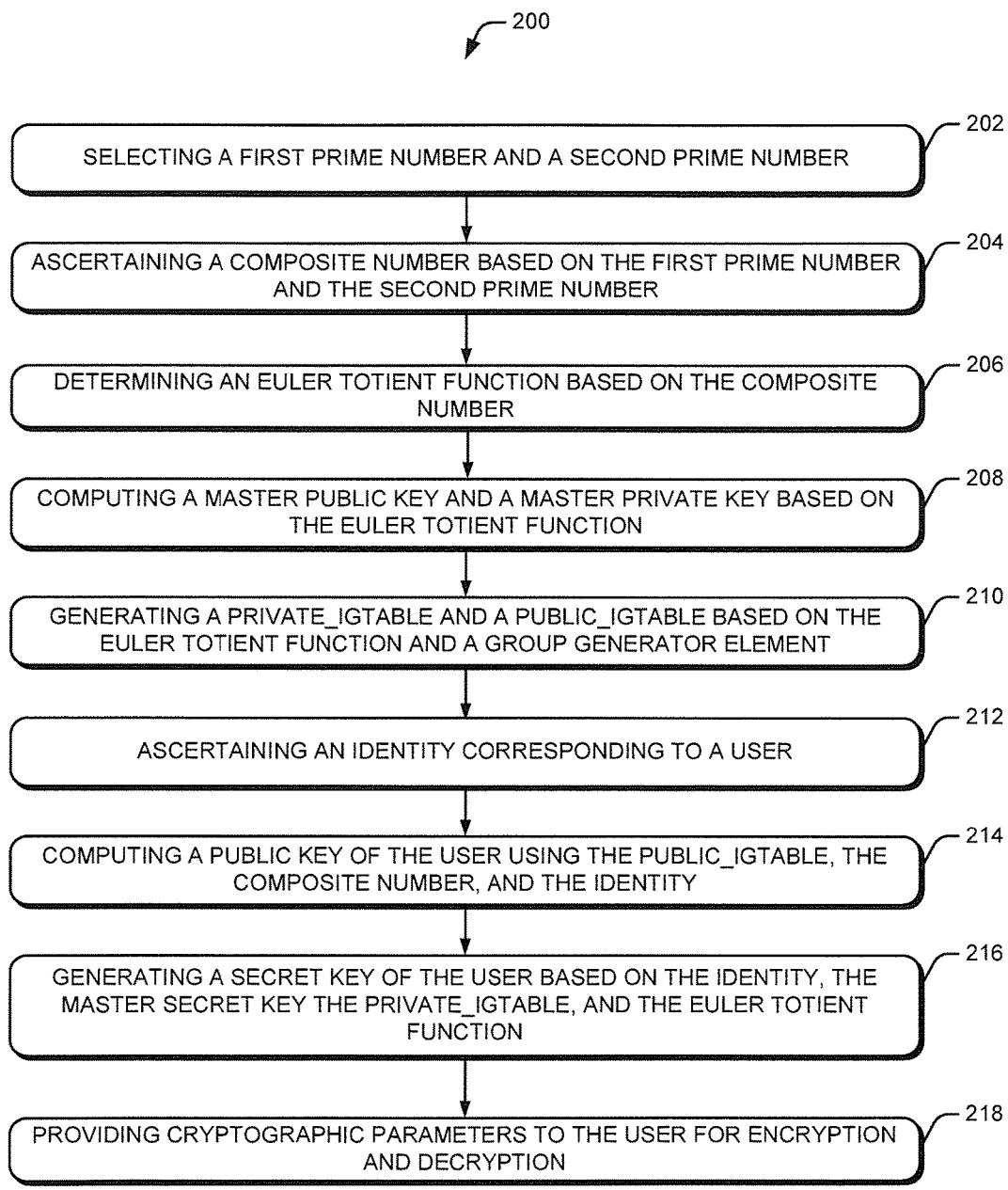
FIG. 2 illustrates a method for generating cryptographic parameters, according to an embodiment of the present subject matter.

FIG. 2 illustrates a method 200 for generating encryption parameters, in accordance with an embodiment of the present subject matter. The method 200 may be described in the general context message of computer executable instructions. Generally, the computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 202, a first prime number and a second prime number are selected. The first prime number and the second prime number are selected such that both, the first prime number and the second prime number, are congruent to three modulo four. In one implementation, the parameter generation module 120 generates the first prime number and the second prime number of the aforementioned form. In the said implementation, the bit length of the first prime number and the second prime number is equal and is of length at least 512 bits. In one implementation, the parameter generation module 120 generates the p1 and the p2 randomly.

At block 204, a composite number is ascertained based on the first prime number and the second prime number. In one implementation, the parameter generation module 120 ascertains the composite number as a result of multiplication between the first prime number and the second prime number illustrated using equation (2), reproduced here below for convenience:

$$n = p1 \times p2 \quad (2)$$

where, n is the composite number, and p1 and p2 are the first prime number and the second prime number, respectively.

Subsequently, at block 206, an Euler totient function of the composite number is determined. In one example, the parameter generation module 120 determines the Euler totient function of the composite number illustrated using equation (3), reproduced here below for convenience:

$$\phi(n) = (p1-1)*(p2-1) \quad (3)$$

where $\phi(n)$ is the Euler totient function of the composite number n and p1 and p2 are the first prime number and the second prime number, respectively.

At block 208, a master public key and a master private key is computed based on the Euler totient function of the composite number. In one implementation, the parameter generation module 120 generates the master public key and the master private key based on the Euler totient function of the composite number illustrated using equation (4), reproduced here below for convenience:

$$e \cdot d \equiv 1 \bmod \phi(n) \quad (4)$$

where, e is the master public key, d is the master private key, and $\phi(n)$ is the Euler totient function of the composite number n. In one example, the master private key is a multiplicative inverse of the mater public key modulo $\phi(n)$. Further, in one implementation, the master public key and the master private key are relatively prime to each other and also relatively prime to $\phi(n)$.

At block 210, a private_IGTABLE and a public_IGTABLE are generated based on the Euler totient function of the composite number and a group generator element. The group generator element may be understood to be an element for generating groups based on one or more predetermined rules and conditions as would be understood by a person skilled in the art. In one implementation, the parameter generation module 120 selects the group generator element of a form such that the group generator element is primitive in G1 and G2, where G1 and G2 are groups ascertained based on the first prime number and the second prime number, respectively. In one implementation, the parameter generation module 120 generates the private_IGTABLE and public_IGTABLE based on the IGTABLE generation process as described earlier. The private_IGTABLE and the public_IGTABLE, in the said implementation, may be understood as an array of length 256. In one implementation, the private_IGTABLE includes a plurality of random numbers, where each of the random number lies in the range of one to a value equal to one less than that of the Euler totient function. Further, the public IGTABLE includes modular exponentiation with group generator element g as the base and corresponding random number of the private_IGTABLE as the exponent under composite number n as modulus. The exponentiation values of the random number is based on the group generator element and a modulo of the composite number according to the relation (5), as described previously.

At block 212, an ID corresponding to a user is ascertained. In one implementation, the parameter generation module 120 computes the ID of the user based on the publically known information of the user, such as an e-mail address, a phone number, date of birth of the user using standard hashing technique known in the art. In another example, the ID may be ascertained as a random bit vector, say, IDA and IDB corresponding to a first user and a second user, respectively. In another implementation, the random bit vector is ascertained based on the random bit vector generation process, as described previously. The ID, in one implementation, may be understood as a binary vector of length 256 bits.

At block 214, a public key of the user is computed using the public_IGTABLE, the ID of the user and the composite number 'n'. In one implementation, the key generation module 122 computes the public key of the first user and the second user, respectively, based on the user public key generation process, as described previously. The public key of a user is used in encryption process for encrypting a piece of information. For example, the first user encrypts an information using the public key of the second user and its own signature.

At block 216, a secret key of the user is generated based on the ID, the master secret key, the private_IGTABLE and the Euler totient function $\phi(n)$. In one implementation, the key generation module 122 computes the secret key corresponding to the ID's of the first user and the second user respectively. In one implementation, the key generation module 122 generates and stores the secret key of the user based on the user secret key generation process, as described previously.

At block 218, cryptographic parameters are provided to the user. The cryptographic parameters include the secret key of the user and a set of public parameters. The public parameters include the group generator element, the composite number, the master public key, the public_IGTABLE, the public key of the user, and the ID of the user. In one implementation, the user interaction module 118 transmits the secret key to the user. For example, the user interaction module 118 transmits the secret key, corresponding to the first user. Further, the user interaction module 118 publishes the public parameters for being used for encryption and decryption.

Subsequently, the first user, upon receiving the cryptographic parameters, generates a public key of the second user based on the ID of the second user, the public_IGTABLE and composite number 'n'. In another implementation, the first user may utilize the public key of the second user as published by the user interaction module 118. Further, the first user encrypts the information using the public key of the second user and its own signature to obtain a ciphertext. The first user transmits the ciphertext to the second user. On receiving the ciphertext, the second user decrypts the ciphertext using its own secret key.

The systems and methods of the present subject matter thus facilitates faster computation of the cryptographic parameters thereby reducing the computation time needed for generating the cryptographic parameters. Further, the present subject matters provides an efficient public key infrastructure, such as the PKI 102, thereby increasing the efficiency of the public key cryptography scheme.

Although embodiments for systems and methods for generating cryptographic parameters have been described in language specific to structural features and/or methods, it is to be understood that the invention is not necessarily limited to the specific features or methods described. Rather, the specific features and methods are disclosed as exemplary implementations for generating the cryptographic parameters.

We claim:

1. A computer implemented method for generating cryptographic parameters for securing information, the method comprising:

generating a private_IGTABLE based on a Euler totient function of a composite number ($\phi(n)$), wherein the private_IGTABLE includes a plurality of random numbers (x) by a parameter generation module coupled to a processor;

generating a public_IGTABLE based on the private_IGTABLE, the composite number (n), and a group generator element (g), wherein the public_IGTABLE includes a modular exponentiation corresponding to each of the plurality of random numbers (x) given by the equation gx(mod n), wherein gx is the modular exponentiation under modulo n, and wherein n is the composite number by the parameter generation module;

computing a public key of a user based on the public_IGTABLE, an identity number (ID) corresponding to the user, and the composite number (n) by a key generation module;

generating a secret key of the user based on the ID, a master private key, the private_IGTABLE and the Euler totient function of the composite number ($\phi(n)$) by the key generation module;

providing the cryptographic parameters to the user for performing encryption and decryption, wherein the cryptographic parameters include at least one of the ID, the public key, and the secret key by the key generation module;

encrypting the cryptographic parameters to obtain a cipher text using a public key of a user, wherein a signature is used for authenticating at least one of a first user and a second user by the key generation module; and requesting a Public Key Infrastructure (PKI) for a plurality of cryptographic parameters and subsequently encrypting the information using the cryptographic parameters to obtain the ciphertext by the key generation module.

2. The computer implemented method of claim 1, wherein the ID is one of a binary vector and a random bit vector, and wherein each of the binary vector and the random bit vector is of length 256, and wherein the random bit vector is ascertained using a random bit vector generation process.

3. The computer implemented method of claim 1, wherein the providing further comprises:

publishing a set of public parameters, wherein the set of public parameters include a composite number (n), the group generator element (g), a master public key (e), the public_IGTABLE, the public key of the user and the ID; and transmitting a secret key to the user, wherein the secret key correspond to the ID of the user.

4. The computer implemented method of claim 3, further comprising receiving a request for generating the cryptographic parameters from the user, wherein the cryptographic parameters include the public parameters and the secret key.

5. The computer implemented method of claim 1, further comprising:
   selecting a first prime number (p1) and a second prime number (p2) of a form 3 modulus 4, and wherein each of the first prime number (p1) and the second prime number (p2) has a bit length of at least 512 bits;
   computing the composite number (n) based on the first prime number and the second prime number, wherein the composite number (n) is obtained as a product of the p1 and p2;
   determining the Euler totient function of the composite number ($\phi(n)$);
   selecting the group generator element (g); and
   computing the master public key (e) and the master private key (d) based on the Euler totient function of the composite number ($\phi(n)$), wherein the $\phi(n)$ is a product of (p1−1) and (p2−1).

6. The computer implemented method of claim 1, wherein the private_IGTABLE and the public_IGTABLE are generated using an IGTABLE generation process.

7. The computer implemented method of claim 1, wherein the ID is computed using hashing technique.

8. The computer implemented method of claim 1, wherein the public key is computed using a user public key generation process.

9. The computer implemented method of claim 1, wherein the secret key is generated based on a user secret key generation process.

10. The computer implemented method of claim 1, wherein the random number (x) has a value in the range of 1 to $\phi(n)$−1.

11. The computer implemented method of claim 1, wherein the master public key (e) is an odd integer having bit length of k-bits.

12. The computer implemented method of claim 1, wherein the master private key (d) is a multiplicative inverse of the master public key (e) modulo $\phi(n)$, and wherein the master private key (d) is relatively prime to the master public key (e), and wherein the master private key (d) and the master private key (e) are relatively prime to $\phi(n)$.

13. The computer implemented method of claim 1, wherein the private_IGTABLE and the public_IGTABLE is an array of length 256.

14. A computer implemented system to generate cryptographic parameters for securing information in a public key infrastructure, comprising:
   a processor;
   a parameter generation module coupled to the processor, the parameter generation module configured to,
   generate a private_IGTABLE based on a Euler totient function ($\phi$) of a composite number (n), wherein the private_IGTABLE includes a plurality of random numbers (x);
   generate a public_IGTABLE based on the private_IGTABLE, the composite number (n), and a group generator element (g), wherein the public_IGTABLE includes a modular exponentiation corresponding to each of the plurality of random numbers (x) given by the equation gx(mod n), wherein gx is the modular exponentiation under modulo n, and wherein n is the composite number; and
   ascertain an identity number (ID) corresponding to a user, wherein the ID is one of a binary vector and a random bit vector, and wherein the binary vector and the random bit vector is of length 256, and wherein the random bit vector is ascertained using a random bit vector generation process; and
   a key generation module coupled to the processor, the key generation module configured to,
   compute a public key of the user based on the public_IGTABLE, the ID, and the composite number (n);
   generate a secret key of the user based on the ID of the user, a master secret key, the private_IGTABLE, and the Euler totient function of the composite number ($\phi(n)$);
   provide the cryptographic parameters to the user for performing encryption and decryption, wherein the cryptographic parameters include at least one of the ID, the public key, and the secret key;
   encrypt the cryptographic parameters to obtain a cipher text using a public key of a user, wherein the signature is used to authenticate at least one of a first user and a second user; and
   request a Public Key Infrastructure (PKI) for a plurality of cryptographic and subsequently encrypt the information using the cryptographic parameters to obtain the ciphertext.

15. The computer implemented system of claim 14, further comprising a user interaction module coupled to the processor, the user interaction module is configured to receive a request for generating cryptographic parameters from the user; wherein the cryptographic parameters include a set of public parameters and the secret key.

16. The computer implemented system of claim 14, further comprising a user interaction module coupled to the processor, the user interaction module is further configured to,
   publish the set of public parameters, wherein the set of public parameters include a composite number (n), the group generator element (g), a master public key (e), the public_IGTABLE, the ID of the user, and the public key of the user; and
   transmit the secret key to the user.

17. The computer implemented system of claim 14, wherein the parameter generation module is further configured to,
   select a first prime number (p1) and a second prime number (p2) of a form 3 modulus 4, and wherein each of the first prime number (p1) and the second prime number (p2) has a bit length of at least 512 bits;
   compute the composite number (n) based on the first prime number and the second prime number, wherein the composite number (n) is obtained as a product of the p1 and p2,
   the Euler totient function of the composite number ($\phi(n)$), wherein the $\phi(n)$ is a product of (p1−1) and (p2−1);
   select the group generator element (g);
   compute the master public key (e) and a master private key (d) based on the Euler totient function ($\phi$) of the composite number (n).

* * * * *